US012738157B2

(12) United States Patent
Fischer et al.

(10) Patent No.: US 12,738,157 B2
(45) Date of Patent: Sep. 15, 2026

(54) METHOD AND SYSTEM FOR THE CAMERA-BASED DETERMINING OF THE SPEED OF A VEHICLE IN TRAFFIC

(71) Applicant: Breuer Nachrichtentechnik GmbH, Bonn (DE)

(72) Inventors: Tobias Fischer, Erlangen (DE); Mykhaylo Filipenko, Kleinmachnow (DE); Markus Hantschmann, Potsdam (DE)

(73) Assignee: Breuer Nachrichtentechnik GmbH, Bonn (DE)

( * ) Notice: Subject to any disclaimer, the term of this patent is extended or adjusted under 35 U.S.C. 154(b) by 51 days.

(21) Appl. No.: 18/836,149

(22) PCT Filed: Feb. 7, 2023

(86) PCT No.: PCT/EP2023/053001

§ 371 (c)(1),
(2) Date: Aug. 6, 2024

(87) PCT Pub. No.: WO2023/152135

PCT Pub. Date: Aug. 17, 2023

(65) Prior Publication Data

US 2026/0024436 A1 Jan. 22, 2026

(30) Foreign Application Priority Data

Feb. 10, 2022 (EP) .................................... 22156143

(51) Int. Cl.
*G06K 9/00* (2022.01)
*G06T 7/246* (2017.01)
(Continued)

(52) U.S. Cl.
CPC ............. *G08G 1/052* (2013.01); *G06T 7/248* (2017.01); *G06T 7/292* (2017.01); *G06T 7/74* (2017.01);
(Continued)

(58) Field of Classification Search
CPC ........... G08G 1/052; G06T 7/292; G06T 7/74; G06T 7/248; G06T 2207/30236;
(Continued)

(56) References Cited

U.S. PATENT DOCUMENTS 7,774,113 B2 * 8/2010 Oyaide .................. G01C 21/26
382/104
11,069,071 B1 * 7/2021 Devitt ....................... G06T 7/11
(Continued)

FOREIGN PATENT DOCUMENTS

EP 2112630 A1 * 10/2009 ............... G06T 7/33
EP 2482557 A1 8/2012

*Primary Examiner* — Avinash Yentrapati
(74) *Attorney, Agent, or Firm* — The Webb Law Firm

(57) ABSTRACT

The method for the camera-based determining of the speed of a vehicle includes the following method steps of
- creating a first, second, third and fourth image capture;
- identifying features in the individual image captures;
- checking for consistency of the individual features;
- discarding the inconsistent features,
- determining the spatial position of the features using a triangulation method;
- determining a speed vector for each feature;
- determining the speed for each feature from the speed vector determined for the corresponding feature and the difference between the first time and the second time; and
- determining an average speed of the vehicle by averaging the determined speeds for each feature.

12 Claims, 5 Drawing Sheets

(51) Int. Cl.

| | |
|---|---|
| ***G06T 7/292*** | (2017.01) |
| ***G06T 7/73*** | (2017.01) |
| ***G06V 10/62*** | (2022.01) |
| ***G06V 10/75*** | (2022.01) |
| ***G06V 20/54*** | (2022.01) |
| ***G08G 1/052*** | (2006.01) |

(52) U.S. Cl.
CPC ............ *G06V 10/62* (2022.01); *G06V 10/751* (2022.01); *G06V 20/54* (2022.01); *G06T 2207/30236* (2013.01); *G06V 2201/08* (2022.01)

(58) Field of Classification Search
CPC ...... G06V 20/54; G06V 10/751; G06V 10/62; G06V 2201/08
See application file for complete search history.

(56) References Cited

U.S. PATENT DOCUMENTS

| | | | | |
|---|---|---|---|---|
| 11,935,249 | B2 * | 3/2024 | Devitt | G01C 22/00 |
| 2009/0263009 | A1 * | 10/2009 | Krishnaswamy | G05D 1/0253 382/154 |
| 2009/0309765 | A1 * | 12/2009 | Wang | G06F 3/017 341/20 |
| 2021/0295537 | A1 * | 9/2021 | Devitt | G01C 22/00 |
| 2022/0042823 | A1 * | 2/2022 | Lee | G01C 11/02 |

* cited by examiner

METHOD AND SYSTEM FOR THE CAMERA-BASED DETERMINING OF THE SPEED OF A VEHICLE IN TRAFFIC

CROSS-REFERENCE TO RELATED APPLICATIONS

This application is the United States national phase of International Patent Application No. PCT/EP2023/053001 filed Feb. 7, 2023, and claims priority to European Patent application Ser. No. 22/156,143.4 filed Feb. 10, 2022, the disclosures of which are hereby incorporated by reference in their entireties.

BACKGROUND OF INVENTION

Field of the Invention

The present invention relates to a method for the camera-based determination of the speed of a vehicle in traffic and a corresponding system for the camera-based speed determination.

Description of Related Art

Numerous methods for determining speed are known from prior art and help to monitor traffic and increase traffic safety.

Over the past ten years, the number of accidents resulting in personal injury that can be attributed to exceeding the local speed limit has decreased by around 20%. Nevertheless, illegal speeding is still considered to be the cause of one in three traffic fatalities in Germany. Monitoring vehicle speeds on the road therefore makes an important contribution to reducing the number of traffic accidents and traffic fatalities, as the use of these methods helps to raise drivers' awareness of the need to comply with the speed limit.

To date, there are various technical solutions for measuring the speed of vehicles in road traffic. The methods known to date can be divided into active and passive methods.

Active methods typically include those methods in which the measuring device emits electromagnetic radiation in the near-optical range (THz, laser and lidar) or in the radio range (GHz, radar and microwaves). The subsequent measurement of the reflection of the radiation emitted by the measuring device allows the speed of a vehicle to be determined. The Doppler effect (phase shift of a single pulse) or the change in the signal propagation time of several consecutive pulses can be used to draw conclusions about the vehicle speed. There are also laser-based methods, for example, which allow conclusions to be drawn about the vehicle speed by evaluating geometric relationships.

The active measurement methods discussed above can certainly provide precise results. However, active measurement methods have the disadvantage that they generally require a lot of energy due to the necessary emission of radiation. As a result, it is often difficult to supply measuring devices for active speed measurement with batteries, accumulators and/or solar cells. In addition, measuring systems for the active measurement of vehicle speeds are usually associated with high acquisition costs.

In addition to the active measurement methods mentioned, passive measurement methods are also used to measure speed. In contrast to active measuring methods, passive methods do not emit any radiation. In contrast, passive methods measure the time it takes a vehicle to cover a known distance. Such procedures are also referred to as distance-time procedures. The sensors used can be light barriers, brightness sensors, pressure sensors (also known as overrun sensors) or induction sensors, which generate a signal when a vehicle passes. Some of the procedures mentioned require structural measures, which greatly increases the costs incurred.

One disadvantage of the methods described is that all of them require a separate camera to record the vehicle data.

Due to the above disadvantages, it is the object of the present invention to provide a simple, inexpensive and precise method for determining the speed of a vehicle in traffic.

To achieve the aforementioned object, the present invention proposes a method for the camera-based determination of the speed of a vehicle in traffic, the method comprising the following method steps:

- capturing a first image at a first point in time using a first image sensor and capturing a second image at the first point in time using a second image sensor; capturing a third image at a second point in time using the first image sensor and capturing a fourth image at the second point in time using the second image sensor;
- identifying features in the individual images;
- matching the features in the images captured by the first image sensor against the features contained in the images captured by the second image sensor at the same point in time, whereby those features which are only contained in the images captured by the first image sensor or in the images captured by the second image sensor are discarded;
- comparing the corresponding features in the images captured by the first image sensor with the features in the images captured by the second image sensor with regard to their epipolar geometry, whereby those features for which the epipolar conditions are not fulfilled are discarded;
- matching the features in the images captured by the first image sensor, whereby those features which are not contained in both images captured by the first image sensor and those features which are not contained in both images captured by the second image sensor are discarded;
- determining features whose position has remained unchanged from the first point in time to the second point in time and removing those features whose position has remained unchanged;
- determining the spatial position of the features using a triangulation method;
- determining a velocity vector for each feature that has not previously been discarded;
- determining the speed for each feature from the speed vector determined for the corresponding feature;
- determining an average speed of the vehicle by averaging the determined speeds for each feature.

The advantage of camera-based speed measurement is that no or hardly any structural measures are required and that the method can be implemented cost-effectively. The use of two image sensors, whose sensor surfaces are in particular inclined towards each other, it becomes possible to determine the position of a vehicle or individual detected feature in a three-dimensional manner and to thereby detect the sped of the vehicle in a three-dimensional manner. The two image sensors can, for example, be arranged side by side (in the sense of a left and a right image sensor) or above one another (in the sense of an upper and a lower image sensor).

The two image sensors each capture an image at a first point in time and a second point in time. However, the invention is not limited to capturing an image at two points in time. Rather, the image sensors can also be configured to capture a plurality of images, so that information of a plurality of images can be used for speed determination. In this regard, said two points in time should be understood as a minimum within the framework of the present invention, such that the individual image sensors produce at least two images.

The first image sensor and the second image sensor together can represent a camera system. Here, the image sensors can be arranged in a housing. In addition, the camera system can comprise image capturing optics which are each arranged between an image sensor and the image capturing area to be monitored (in which the vehicles are to be captured).

Specific features are detected in each of the images captured by the image sensors. For this purpose, one can rely on one of several feature detection methods (also called feature recognition algorithms) known from prior art. For example, the SIFT (Scale Invariant Feature Transform), SURF (Speed Up Robust Feature), BRIEF (Binary Robust Independent Elementary Feature) or ORB (Oriented FAST and Rotated BRIEF) methods can be used to detect the features. A Harris Corner Detector can also be used for feature recognition in order to detect distinctive corner points within an image.

The features can be a prominent point within the image. For example, a corner point within an image that has a particularly high contrast can be detected. Alternatively, the feature can also refer to a line or another geometric shape (e.g. a rectangle or a trapezoid). In practice, several tens, several 100, several 1,000 or even more features can be recognized within one image or belong to the same vehicle. Since the processing of a large number of features increases the computing effort and consequently the computing time required on the one hand and reduces the inaccuracy due to expected errors in the recognition of individual features in the image recordings on the other hand, a specific selection of the determined features is performed within the framework of the present invention before the speed of the vehicle is ultimately determined on the basis of the determined features. This significantly increases the efficiency of the measurement process on the one hand and reduces the susceptibility to errors on the other hand.

During selection, the features captured by the first image sensor are matched against the features captured by the second image sensor. If a feature, for example a prominent point, was recognized at a first time t1 in the first image and this feature does not appear in the second image (also captured at time t1), this feature is discarded for further processing. After this process step, only those features remain that are actually contained in the images that were captured by both image sensors at the same time. In this way, an initial consistency check is performed, whereby all inconsistent features are not taken into account for the speed calculation.

A feature known in an image recording can be described by a vector, for example. Ideally, two corresponding features in two images should have identical values. As a result, two features must be considered as identical, if their feature vectors are identical. In practice, however, matching two features can be performed such that not only the identity of two feature vectors allows to conclude on the same feature, but that first a distance between two feature vectors is calculated and the two features are assumed to be identical, if the distance between the feature vectors is smaller than a preset threshold. For a calculation of the distance between two feature vectors, the Hamming distance or the Euclidean distance can be used.

In addition, the features in the images captured by the first image sensor and the second image sensor at the same point in time are compared with respect to their epipolar geometry. If the epipolar condition for two features is met, it is assumed that these points are consistent. In this case, the features are retained. If the epipolar condition for two features is not met, this indicates that the features are inconsistent, so that the inconsistent features are removed and are neglected during the later speed determination. In general, the epipolar condition for two points is met, if the following equation (also referred to as epipolar equation) is met:

$$p_2^T F p_1 = 0.$$

or $$\begin{pmatrix} x_2 & y_2 & 1 \end{pmatrix} \begin{pmatrix} f_{11} & f_{12} & f_{13} \\ f_{21} & f_{22} & f_{23} \\ f_{31} & f_{32} & f_{33} \end{pmatrix} \begin{pmatrix} x_1 \\ y_1 \\ 1 \end{pmatrix} = 0.$$

Here, $p_1$ refers to a point in the first image, $p_2$ refers to a point in the second image, and F refers to the fundamental matrix. The fundamental matrix is calculated from the geometric relation of the two cameras (translation and rotation) and the intrinsic camera parameters. It describes an imaging rule between coordinate systems of both cameras. If the features represent individual points, it can be determined immediately by checking the above condition, whether the two features correspond to each other. If the features represent geometric shapes, it is possible to compare, for example, one point or a plurality of points of the geometric shape of each of the respective images with respect to their epipolar geometry. For example, in case of a line, the check of the epipolar condition can be applied to the two end points of the line in order to check, whether the lines detected in two images describe the same feature.

In practice, the fulfillment of the epipolar condition can be defined in such a way that the product of $p_2$ (transposed), the fundamental matrix F and $p_1$ is not exactly equal to 0, but is smaller than a specified limit value.

Furthermore, the features determined in two consecutive images captured by an image sensor are checked for consistency. Those features that are not contained in both images captured by the first image sensor or the second image sensor are discarded. As explained above, an image sensor can be designed to generate more than two images. In this case, it may be necessary to discard those features that are not contained in all images generated by an image sensor.

In order to further increase the efficiency of the method according to the invention, the features whose positions have remained unchanged over time are also determined in the present invention, wherein these "constant" features are discarded. This further reduces the total number of features used for speed determination to those features that actually move between the first and second points in time and which therefore contain information about the vehicle speed. Thereby, it can be prevented in an advantageous way that features that can be assigned to a building or road marking, for example, are unnecessarily included.

After those features that are considered inconsistent have been discarded, the spatial position of the features is determined using a triangulation method. Triangulation methods are known from prior art and enable the position of an object to be determined using trigonometric relationships.

As soon as the position of a feature is determined at the first and second points in time, a speed vector is determined for each feature. The time difference between two consecutive images and the displacement vector (also known as the movement vector) for each (consistent) feature can then be used to determine the speed for each of the (consistent) features. The time difference between two images can generally be assumed to be known. This can be derived, for example, from the image capturing frequency of the image sensors used. If the image sensors are used with an image capturing frequency of 20 fps (frames per second), it can be deduced therefrom that the time difference between two consecutive images is 50 ms. If two images from a video sequence are used to determine the speed, which are ten frames apart, it can be concluded that the time difference between the images used is 500 ms. In this respect, a speed vector can be determined as the quotient of a displacement vector, which describes the movement of a feature between two images and is defined by the start position and the end position of the feature, and the time difference between the two images. According to the present invention, the speed vector can therefore be determined for the respective feature by determining the quotient of a displacement vector, which describes the movement of a feature between two images and is defined by the start position and the end position of the respective feature, and the time difference between two images. The speed can be determined for one feature at a time by determining the magnitude of the speed vector for the corresponding feature.

Thereafter, a average speed of the vehicle can be determined, by calculating a average value from the individual speeds determined for each feature. For example, an arithmetic average value can be formed from the individual speed values or the median value can be determined from the individual speed values. Here, only those features or the speed values for those features are included that were previously considered to be consistent and were not discarded.

SUMMARY OF THE INVENTION

Although the present invention has been described above in the context of a specific sequence, it is obvious to a skilled person that the sequence of the method steps is not obligatory. For example, the sequence of the individual consistency checks regarding the individual features can be switched without deviating from the present invention.

According to one embodiment of the invention, it may be provided that the method additionally comprises the following method step:

checking the consistency of the speed vectors using a RANSAC method, wherein those speed vectors are discarded that were rated inconsistent.

RANSAC methods (Random Sample Consensus method) are generally known from prior art. Using a RANSAC method makes it possible to detect outliers in a set of measurement data. In this case, while taking into account the average value of the recorded measurement data and a preset tolerance range, those measurement values are identified that are outside the preset tolerance range.

As an alternative to the RANSAC method, it is also possible, according to the invention, to use a special variant of the DBScan method. Here, the determined 3D points and speed vectors are "clustered" simultaneously in a 6-dimensional space, i.e. consistent groups are formed with regard to a 6-dimensional metric. Each consistent group corresponds to a vehicle moving in the visible field of view.

A consistent group that is visible over several consecutive images, but at least over two consecutive images, is also referred to as a "cluster". The measured speed value for a cluster is formed as soon as the geometric center of gravity thereof falls below a fixedly defined distance from the measuring device. Here, the speed values of all points belonging to all consistent groups of the cluster are used.

According to the invention, the consistent groups can be combined into a cluster by determining the geometric center of gravity for each consistent group and checking whether it has moved by the distance corresponding to the speed vector of the respective consistent group within the corresponding time difference between the frames.

According to one embodiment of the method according to the invention, it can be provided that a time signature (often also referred to as a time stamp or digital time stamp) is generated during the capture of each image, which is attached or assigned to the image. With the additional time signature, the exact time at which an image was actually captured can be precisely defined. In this way, the accuracy of the method according to the invention can be increased.

According to one embodiment of the method according to the invention, it may also be provided that the method comprises the following method step:

checking the consistency of the direction of the individual speed vectors, wherein the angle between the individual speed vectors and a predetermined reference line is determined in each case and an angle average value is determined from the determined angle values and those speed vectors are regarded as inconsistent for which the difference between the determined angle and the angle average value is greater than a predetermined limit value, and wherein those speed vectors which are regarded as inconsistent are discarded.

In particular, the reference line can run parallel to the monitored lane. In general, it is to be expected that the detected features of the vehicle have a direction of movement that is essentially parallel to the road. If the direction of movement shows a clear deviation from the reference line (and consequently the determined angle value exceeds a specified limit value), this can be taken as an indicator that a determined speed vector is inconsistent. This approach allows the individual speed vectors, which are to be regarded as inconsistent, to be discarded. The accuracy of the method can be further increased by subsequently limiting it to the consistent speed vectors for the subsequent velocity calculation. At the same time, the susceptibility to errors of the measurement procedure is reduced.

Furthermore, according to the present invention, it may be provided that the method according to the invention comprises the following method step:

checking the consistency of the amount of the individual speed vectors using a RANSAC method, wherein those speed vectors are discarded that were regarded as inconsistent.

While the consistency of the direction of the speed vectors was checked in the method step described above, the consistency of the amount is checked in this method step. Here, outliers determined by the RANSAC method used are ignored in the subsequent calculation of the vehicle speed. A limit value can be defined, whereby those measurement values that exceed the limit value are regarded as outliers. By checking the consistency of the vector amounts and by discarding inconsistent values, the efficiency of the present measurement method can be further increased, while simultaneously reducing the susceptibility to errors.

According to a preferred embodiment of the invention, it can be provided that the method according to the invention comprises the following method step:

comparing the corresponding features in the images captured by the first image sensor at the first point of time and at the second point of time and comparing the corresponding features in the images captured by the second image sensor at the first point in time and at the second point in time with regard to their epipolar geometry, whereby those features for which the epipolar conditions are not fulfilled are discarded.

Thereby, the number of features used for the final speed determination can be further reduced, wherein only the consistent features are considered for the speed determination. In this manner, the efficiency of the method according to the invention can be further increased and simultaneously the precision of the method can be enhanced, since significantly fewer measurement values have to be used for the final speed determination and because inconsistent measurement values remain unconsidered in the speed determination.

Further, to achieve the above-described object, a system for determining the speed of a vehicle in traffic is proposed, the system comprising the following:

- a first image sensor for capturing a first image at a first point in time and a third image at a second point in time;
- a second image sensor for capturing a second image at the first point in time and a fourth image at a second point in time; and
- an evaluation unit, the evaluation unit being configured to detect features in the individual images;
  - match the features in the images captured by the first image sensor against the features contained in the images captured by the second image sensor, and discard those features which are only contained in the images captured by the first image sensor or in the images captured by the second image sensor;
  - compare the corresponding features in the images captured by the first image sensor with the features in the images captured by the second image sensor with regard to their epipolar geometry, and discard those features for which the epipolar condition is not fulfilled;
  - match the features in the images captured by the first image sensor to each other, and discard those features which are not contained in both images captured by the first image sensor and those features which are not contained in both images captured by the second image sensor;
  - determine the features whose position has remained unchanged from the first point in time to the second point in time and remove those features whose position has remained unchanged;
  - determine the spatial position of the individual features using a triangulation method;
  - determine a speed vector for each feature;
  - determine the speed for each feature from the speed vector determined for the corresponding feature;
  - determining an average speed of the vehicle by averaging the determined speeds for each feature.

The first image sensor and the second image sensor can, for example, be designed as CCD sensors or CMOS sensor. The sensors can be inclined towards each other and be arranged in a common sensor housing. Moreover, image capturing optics can be provided which are arranged between the respective image sensor and the image object to be captured. The evaluation unit can be designed, for example, as an integrated computing unit with a CPU or a GPU, an ASIC, a microcontroller or a FPGA. In addition, the system according to the invention can comprise a storage unit to store the images. As an alternative, it can be provided that an external cloud storage is used in which the images are stored. In this case, the measurement system according to the invention can comprise a communication unit for exchanging information with the external cloud storage.

In the system according to the invention, the evaluation unit can additionally be set up to check the consistency of the speed vectors using a RANSAC method, whereby those speed vectors which are considered to be inconsistent are discarded.

The system according to the invention can also have a timer which is set up to generate a time signature at the time of an image capture, which is attached or assigned to the respective image.

Furthermore, it may be provided in that system according to the invention that the evaluation unit is configured to check the consistency of the direction of the individual speed vectors, wherein the angle between the individual speed vectors and a predetermined reference line is determined in each case and an angle average value is determined from the determined angle values and those speed vectors are regarded as inconsistent for which the difference between the determined angle and the angle average value is greater than a predetermined limit value, and wherein those speed vectors which are regarded as inconsistent are discarded.

In addition, it may be provided that the evaluation unit is configured to check the consistency of the amount of the individual speed vectors using a RANSAC method, whereby those speed vectors that are considered inconsistent are discarded.

Moreover, the evaluation unit can in addition be configured to compare the corresponding features in the images captured by the first image sensor at the first point of time and at the second point of time and to compare the corresponding features in the images captured by the second image sensor at the first point in time and at the second point in time with regard to their epipolar geometry, whereby those features for which the epipolar conditions are not fulfilled are discarded.

BRIEF DESCRIPTION OF THE DRAWINGS

The present invention is explained in more detail below with reference to the Figures. In the Figures.

DESCRIPTION OF THE INVENTION

Figure 1:
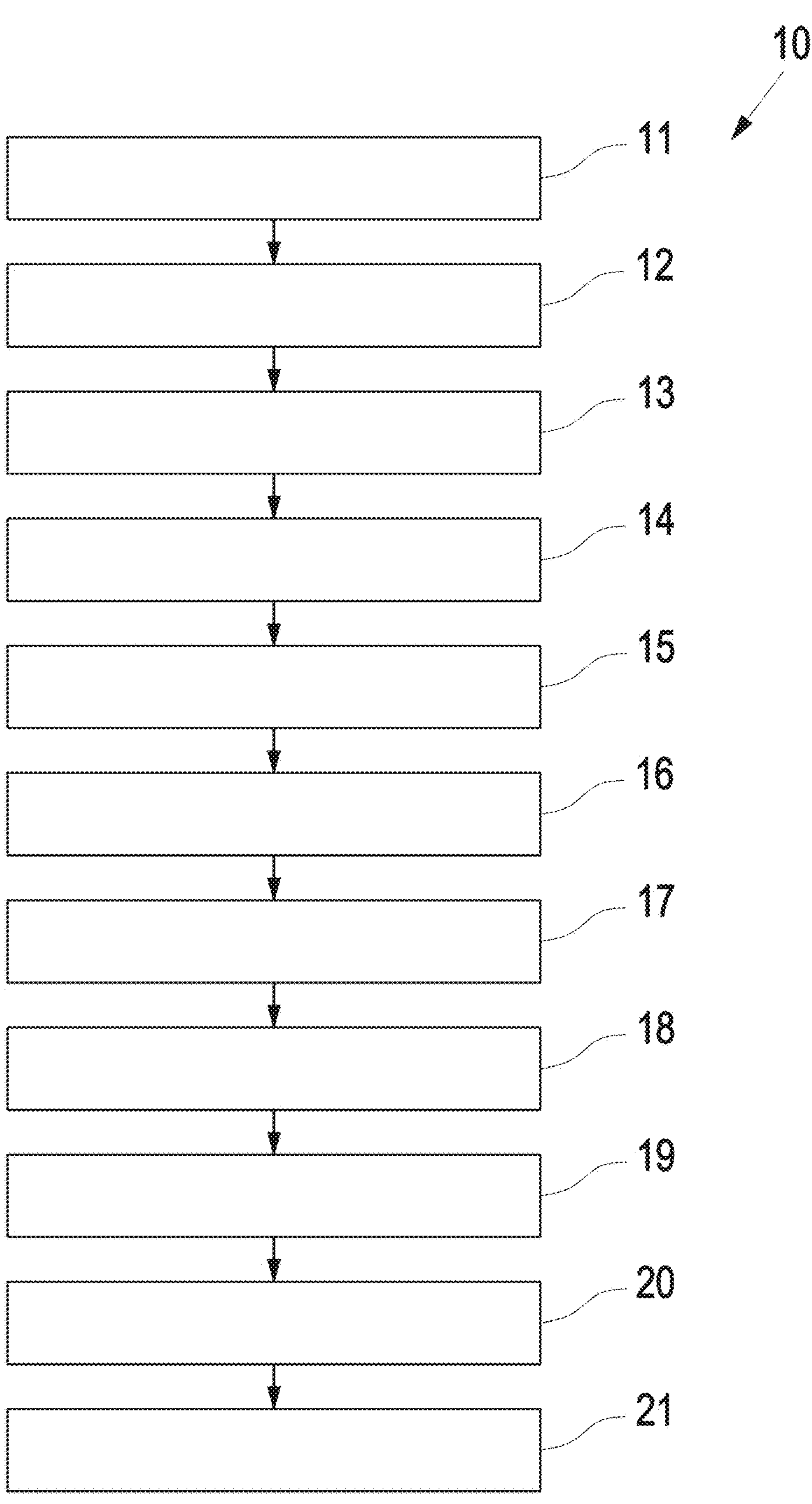
FIG. 1 is an example of an embodiment of the method according to the invention.

FIG. 1 shows an embodiment of the method 10 according to the invention. In the embodiment illustrated, the method 10 according to the invention comprises a total of eleven method steps 11-21. In the first method step 11, a first image and a second image are captured at a first point in time, using a first image sensor and a second image sensor. In the second method step 12, a third image and a fourth image are captured at a second point in time. Thereafter, features in the individual images are detected in the third method step 13. For this purpose, one of the above-described methods for feature detection (for example, a Harris Corner Detector) can be implemented. However, the present invention is not limited to the implementation of a single feature detection method. In the fourth method stop 14, the features detected in the images of the first image sensor are matched against the features detected in the images of the second image sensor. In particular, the features in the first image can be matched against the features in the second image, and the features in the third image can be matched against the features of the fourth image. In other words, in particular those features in the images captured at the same time by the first image sensor and the second sensor can be matched against each other. Here, those features that are contained only in the image of an individual image sensor are discarded for the later speed determination. These features are considered as inconsistent features, so that discarding these features contributes to increasing the precision of the calculation of the vehicle speed. In the fifth method step 15, the corresponding features (i.e. those features that are recognized by both the first image sensor and the second image sensor) are compared with regard to their epipolar geometry, with those features for which the epipolar condition is not fulfilled being discarded. These features are also considered as inconsistent features, so that discarding these features also contributes to increasing the precision of the calculation of the vehicle speed. In the sixth method step 16, the features captured by one image sensor at different times are matched against each other. All those features that are only contained in one image are considered inconsistent and are discarded. In the seventh method step 17, those features are determined whose position has remained unchanged at the first and second points in time. These features, which are also considered as constant features, refer to objects that are motionless in the captured image sequence (for example, they may be the features of a building), so that these features are obsolete for the speed calculation. The constant characteristics are therefore also discarded and are not taken into account in the subsequent speed calculation. Discarding the inconsistent features increases the accuracy of the calculation and at the same time the efficiency of the method according to the invention. In the eighth method step 18, the position of the features is determined using a triangulation method. In the ninth method step 19, a speed vector is then determined for each detected (and not discarded) feature. In the tenth method step 20, the speed for each of the detected features (unless previously discarded) is calculated from the speed vector determined for the corresponding feature. Finally, in the eleventh method step 21, the average speed of the vehicle is determined by communicating the previously determined speeds for each relevant (i.e. consistent) feature.

Even if the method steps described above have been described in a predetermined order for reasons of illustration, it is apparent to a person skilled in the art that compliance with the order is not binding and that, for example, the order of the individual steps for discarding inconsistent features can be changed without deviating from the principle of the present invention.

Figure 2:
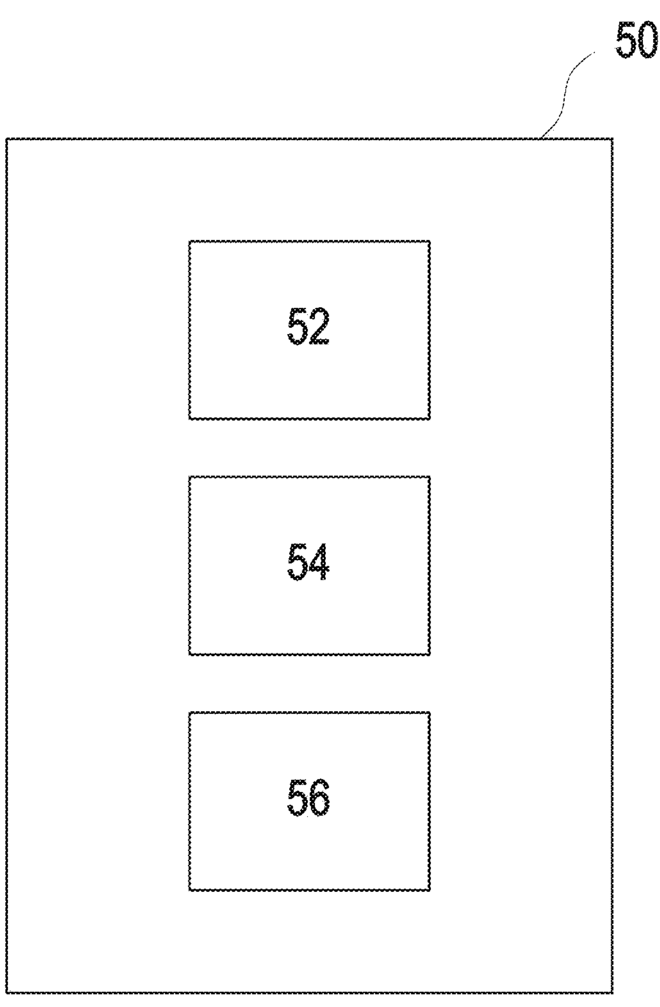
FIG. 2 is an example of an embodiment of the system according to the invention.

FIG. 2 shows an embodiment of the system 50 according to the invention. The system 50 has a first image sensor 52 and a second image sensor 54. The image sensors 52, 54 can be configured in particular as a CCD image sensor or as a CMOS image sensor. The image sensors 52, 54 can each be configured to create an image sequence from at least two images. The image sensors can preferably be configured to record a video sequence that can be used to calculate individual vehicle speeds. In addition, the system 50 has an evaluation unit 56, the evaluation unit being configured to perform the method steps described in connection with FIG. 1.

Figure 3:
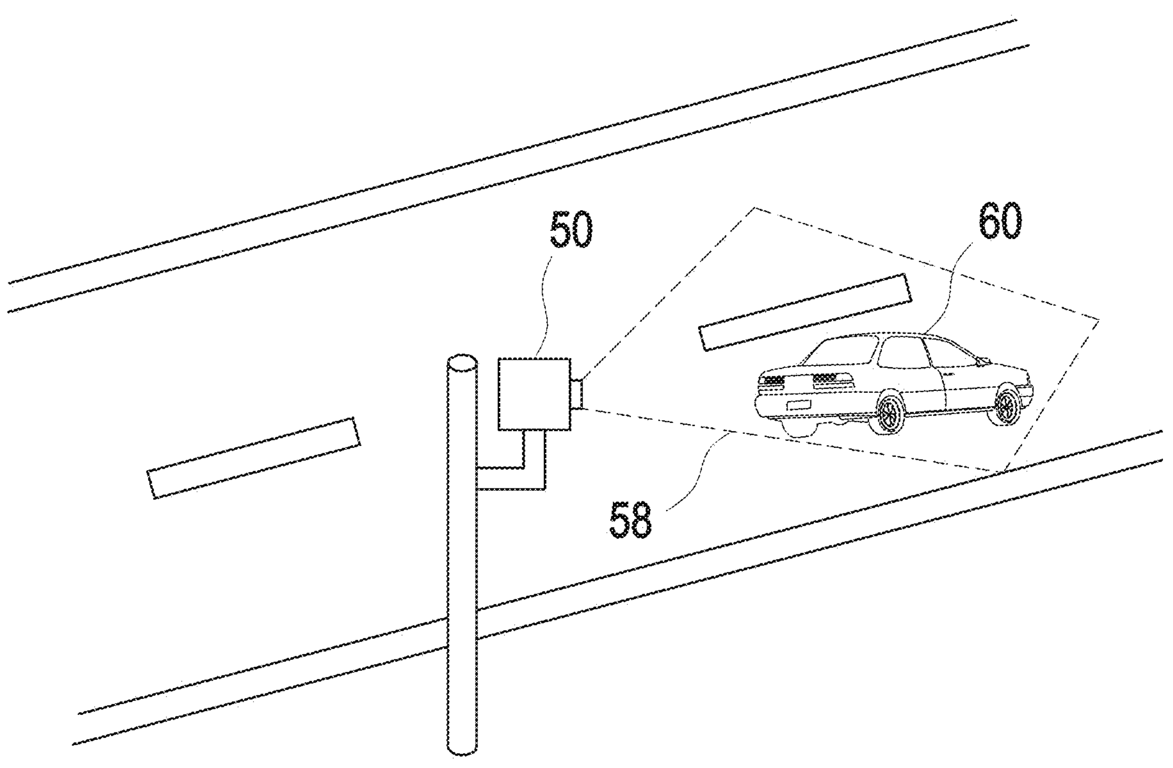
FIG. 3 is a schematic representation of speed measurement in traffic.

FIG. 3 schematically illustrates the principle of speed measurement using the system 50 according to the invention. As shown in this Figure, the system 50 according to the invention can be mounted at a roadside, for example. The system 50 is aligned in such a way that it can monitor a detection area 58. All vehicles 60 passing the detection area 58 can be monitored by the system 50, wherein in particular the speed of the vehicle 60 can be determined by means of the above-described method. If the system 50 according to the invention has detected the speed of the vehicle 60, the determined speed can be compared to the maximum speed allowed in this road section using this method. If the vehicle 60 exceeds the allowed maximum speed, at least one image of the vehicle 60 is stored and forwarded to the authority concerned. In this case, for example, a single image of the vehicle 60, together with the determined speed, can be forwarded to the authority to identify the vehicle owner. As an alternative, it is also possible to store and forward the captured image sequences, so that the correctness of the speed calculation can be verified at a later time, should the speeding be challenged by the vehicle owner.

Figure 4:
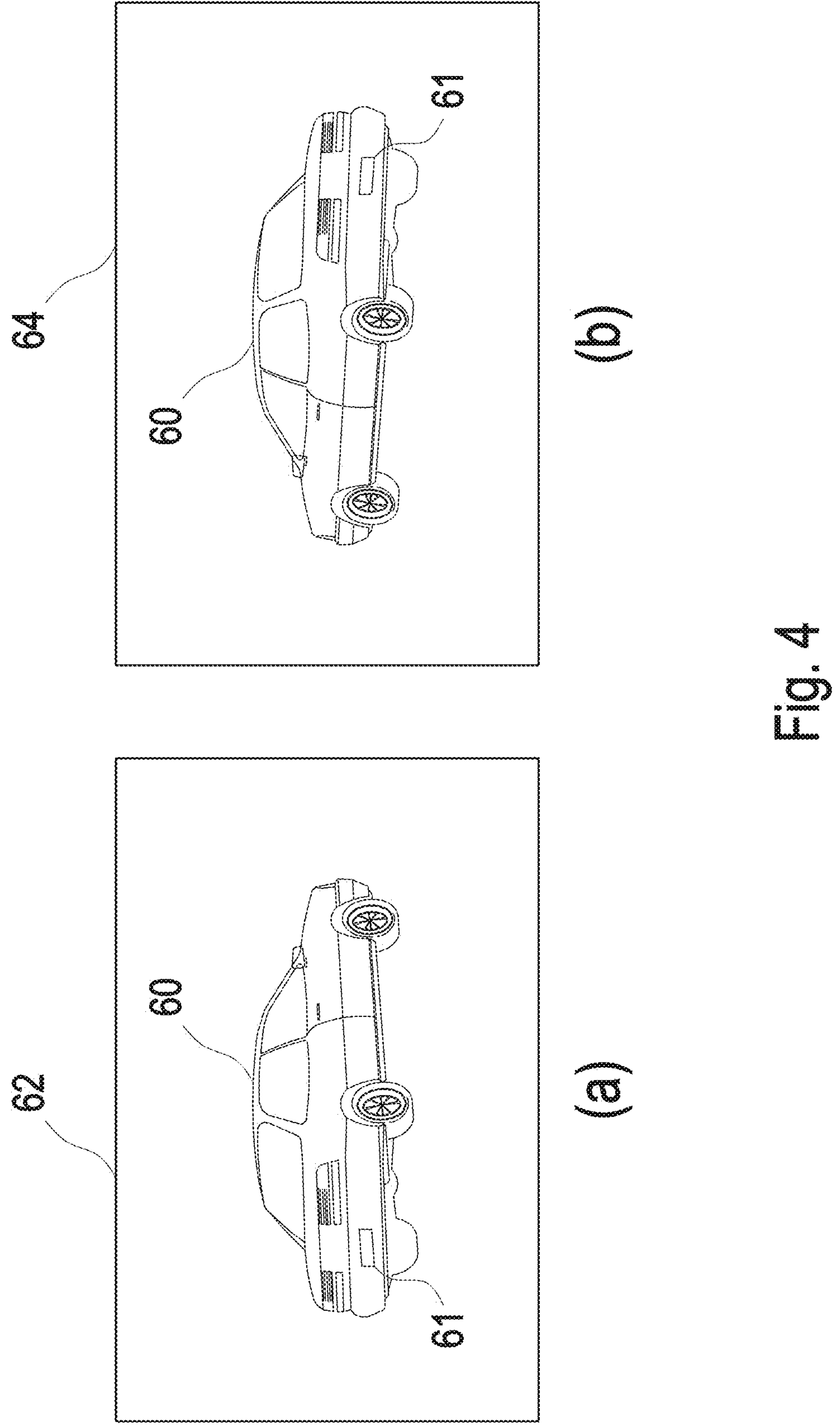
FIG. 4 is a first image and a second image generated at a first point in time, and FIG. 5 a third and a fourth image, which were generated at a second point in time.

FIG. 4 shows a first image 62 and a second image 64, each generated at a first point in time t1. The first image 62 was generated by a first image sensor, while the second image 64 is captured a second image sensor. The two image sensors capture the corresponding images from different perspectives. In the first image 62, a vehicle 60 can be seen. A feature 61 was detected in the image 62. This feature 61 is a corner point of the vehicle license plate. One of the above-described methods can be used for feature detection. For example, a Harris Corner Detector can be used for this purpose. The feature 61 was also detected in the second image 64. The feature 61 can be described by means of a feature vector, for example. By comparing the feature vectors of the features detected in the first image 62 and the second image 64, it can be checked, whether the same feature was detected in both images 62, 64. If this is the case, both features 61 are retained. If the features 61 are contained in only one of the images 62, 64, the features are classified as inconsistent and are consequently discarded.

Using trigonometric relationships, the position of the feature 61 at the first point in time can be determined. Although FIG. 4 shows the detection of a single feature, a plurality of features is detected in one image in practice, wherein subsequently a consistency check is performed for the individual features, and all those features, which are considered as inconsistent, are discarded for the subsequent speed calculation. For example, several 100 or several 1,000 characteristic points can be detected in an image or on a vehicle, with a large part of these points or features being discarded for the subsequent calculation, so as to obtain a selection of features considered as relevant for speed calculation.

Figure 5:
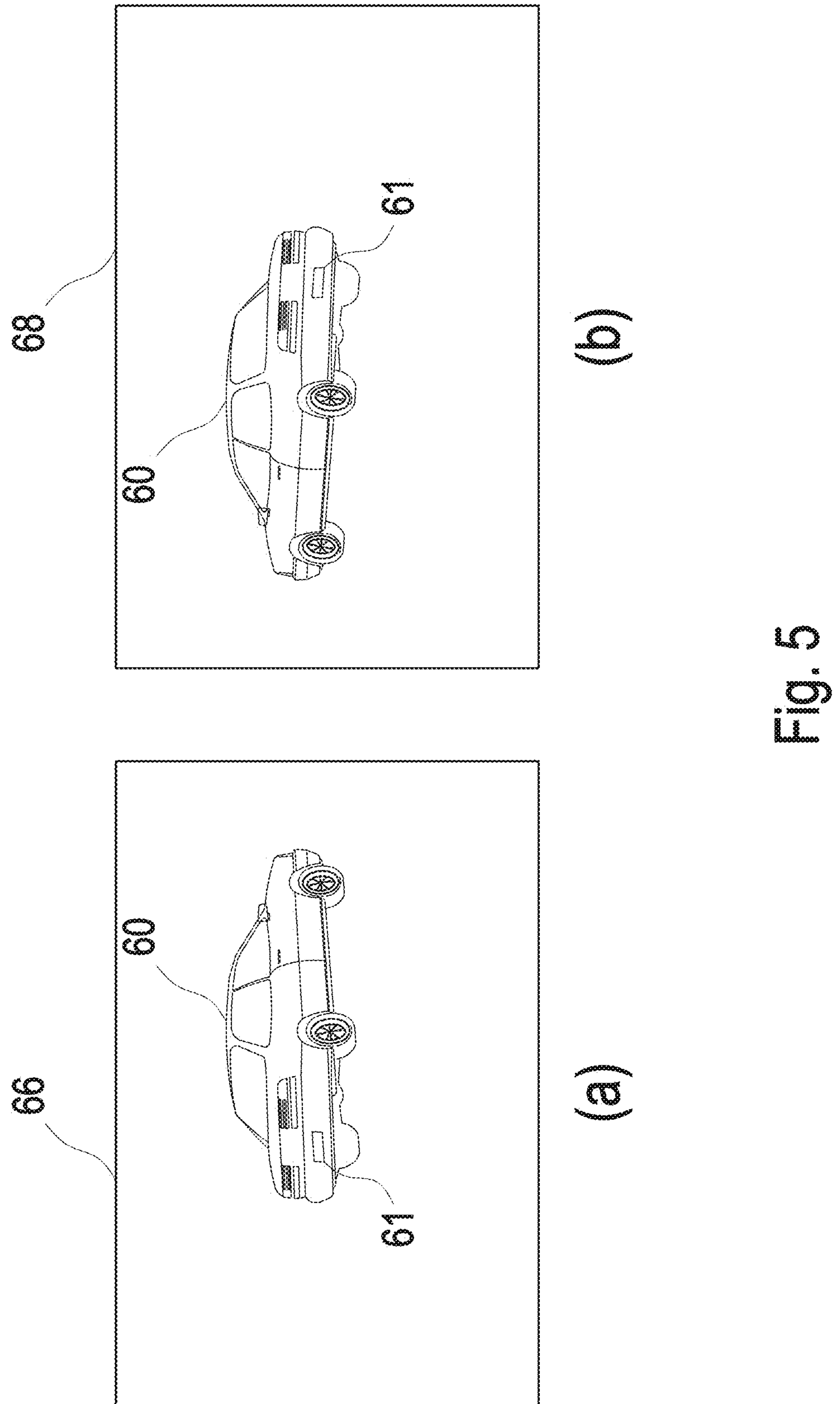

FIG. 5 shows a third image 66 and a fourth image 68 captured at a second point in time t2. The third image 66 was captured by the first image sensor, while the fourth image 68 was captured by the second image sensor. The same vehicle 60 that could be seen before in FIG. 4 is shown in images 66, 68. As shown in FIG. 5, the vehicle 60 has covered a certain distance when compared to the first point in time t1. As a consequence, the position of the feature 61 has changed from FIG. 4 to FIG. 5. Thereby, it is possible to determine a speed vector for the feature 61. From the speed vector an the time difference between the images shown in FIGS. 4 and 5, a speed can thereafter be determined for the feature 61. The above-described speed determination can be performed for each individual of the features rated consistent, wherein the average speed of the vehicle 60 can be calculated subsequently by averaging the speeds determined before for each individual feature. Here, the speed vectors considered as outliers can be neglected in the speed determination.

According to another aspect of the present invention, further, a method for the camera-based determination of the speed of a vehicle in traffic is proposed, the method comprising the following method steps:

- capturing a first image at a first point in time using a first image sensor and capturing a second image at the first point in time using a second image sensor;
- capturing a third image at a second point in time using the first image sensor and capturing a fourth image at the second point in time using the second image sensor;
- identifying features in the individual images;
- matching the features in the images captured by the first image sensor against the features contained in the images captured by the second image sensor at the same point in time, whereby those features which are only contained in the images captured by the first image sensor or in the images captured by the second image sensor are discarded;
- comparing the corresponding features in the images captured by the first image sensor with the features in the images captured by the second image sensor with regard to their epipolar geometry, whereby those features for which the epipolar conditions are not fulfilled are discarded;
- matching the features in the images captured by the first image sensor, whereby those features which are not contained in both images captured by the first image sensor and those features which are not contained in both images captured by the second image sensor are discarded;
- determining features whose position has remained unchanged from the first point in time to the second point in time and removing those features whose position has remained unchanged;
- determining the spatial position of the features using a triangulation method;
- determining a velocity vector for each feature that has not previously been discarded;
- determining the speed for each feature from the speed vector determined for the corresponding feature and the difference between the first time and the second time;
- determining an average speed of the vehicle by averaging the determined speeds for each feature.

LIST OF REFERENCE NUMERALS

- 10 method
- 11 first method step
- 12 second method step
- 13 third method step
- 14 fourth method step
- 15 fifth method step
- 16 sixth method step
- 17 seventh method step
- 18 eighth method step
- 19 ninth method step
- 20 tenth method step
- 21 eleventh method step
- 50 system
- 52 first image sensor
- 54 second image sensor
- 56 evaluation unit
- 58 detection area
- 60 vehicle
- 61 feature
- 62 first image
- 64 second image
- 66 third image
- 68 fourth image

The invention claimed is:

1. A method for the camera-based determining of the speed of a vehicle in traffic, the method comprising the following method steps:

- capturing a first image at a first point in time using a first image sensor and capturing a second image at the first point in time using a second image sensor;
- capturing a third image at a second point in time using the first image sensor and capturing a fourth image at the second point in time using the second image sensor;
- identifying features in the individual images;
- matching the features in the images captured by the first image sensor against the features contained in the images captured by the second image sensor at the same point in time, whereby those features which are only contained in the images captured by the first image sensor or in the images captured by the second image sensor are discarded;
- comparing the corresponding features in the images captured by the first image sensor with the features in the images captured by the second image sensor with regard to their epipolar geometry, wherein those features for which the epipolar conditions are not fulfilled are discarded;
- matching the features in the images captured by the first image sensor, wherein those features which are not contained in both images captured by the first image sensor and those features that are not contained in both images captured by the second image sensor are discarded;
- determining features whose position has remained unchanged from the first point in time to the second point in time and removing those features whose position has remained unchanged;
- determining the spatial position of the features using a triangulation method;
- determining a speed vector for each feature;
- determining the speed for each feature from the speed vector determined for the corresponding feature; and
- determining an average speed of the vehicle by averaging the determined speeds for each feature.

2. The method according to claim 1, further comprising:

- checking the consistency of the speed vectors using a RANSAC method, wherein those speed vectors are discarded that were rated inconsistent.

3. The method according to claim 1, wherein every time an image is captured, a time signature is generated which is attached or assigned to the image.

4. The method according to claim 1, further comprising:

- checking the consistency of the direction of the individual speed vectors, wherein the angle between the individual speed vectors and a predetermined reference line is determined in each case and an angle average value is determined from the determined angle values and those speed vectors are regarded as inconsistent for which the difference between the determined angle and the angle average value is greater than a predetermined limit value, and wherein those speed vectors which are regarded as inconsistent are discarded.

5. The method according to 4, further comprising:

checking the consistency of the amount of the individual speed vectors using a RANSAC method, wherein those speed vectors are discarded that were regarded as inconsistent.

6. The method according to claim 1, further comprising:

comparing the corresponding features in the images captured by the first image sensor at the first point of time and at the second point of time and comparing the corresponding features in the images captured by the second image sensor at the first point in time and at the second point in time with regard to their epipolar geometry, whereby those features for which the epipolar conditions are not fulfilled are discarded.

7. A system for determining the speed of a vehicle in traffic, comprising a first image sensor for capturing a first image at a first point in time and a third image at a second point in time;

a second image sensor for capturing a second image at the first point in time and a fourth image at a second point in time; and an evaluation unit, the evaluation unit being configured to detect features in the individual images;

match the features in the images captured by the first image sensor against the features contained in the images captured by the second image sensor, and discard those features which are only contained in the images captured by the first image sensor or in the images captured by the second image sensor;

compare the corresponding features in the images captured by the first image sensor with the features in the images captured by the second image sensor with regard to their epipolar geometry, and discard those features for which the epipolar conditions are not fulfilled;

match the features in the images captured by the first image sensor, and discard those features which are not contained in both images captured by the first image sensor and those features that are not contained in both images captured by the second image sensor are discarded;

determine the features whose position has remained unchanged from the first point in time to the second point in time and remove those features whose position has remained unchanged;

determine the spatial position of the individual features using a triangulation method;

determine a speed vector for each feature;

determine the speed for each feature from the speed vector determined for the corresponding feature; and determine an average speed of the vehicle by averaging the determined speeds for each feature.

8. The system according to claim 7, wherein the evaluation unit additionally configured to check the consistency of the speed vectors using a RANSAC method, wherein those speed vectors which were rated as inconsistent are discarded.

9. The system according to claim 7, further comprising a timer configured to generate a time signature at the time of capturing an image, which is attached or assigned to the respective image.

10. The system according to claim 7, wherein the evaluation unit is configured to check the consistency of the direction of the individual speed vectors, wherein the angle between the individual speed vectors and a predetermined reference line is determined in each case and an angle average value is determined from the determined angle values and those speed vectors are regarded as inconsistent for which the difference between the determined angle and the angle average value is greater than a predetermined limit value, and wherein those speed vectors which are regarded as inconsistent are discarded.

11. The system according to claim 7, wherein the evaluation unit is further configured to check the consistency of the amount of the individual speed vectors using a RANSAC method, wherein those speed vectors that are considered inconsistent are discarded.

12. The system according to claim 7, wherein the evaluation unit is additionally configured to compare the corresponding features in the images captured by the first image sensor at the first point of time and at the second point of time and compare the corresponding features in the images captured by the second image sensor at the first point in time and at the second point in time with regard to their epipolar geometry, whereby those features for which the epipolar conditions are not fulfilled are discarded.

* * * * *